ered and an inner surface of the milk chamber. In this invention, the milk inlet is so arranged that the milk will flow into the milk chamber without any splashing or spraying, and the milk will flow down the inner surface of the milk chamber in a smooth, continuous stream.

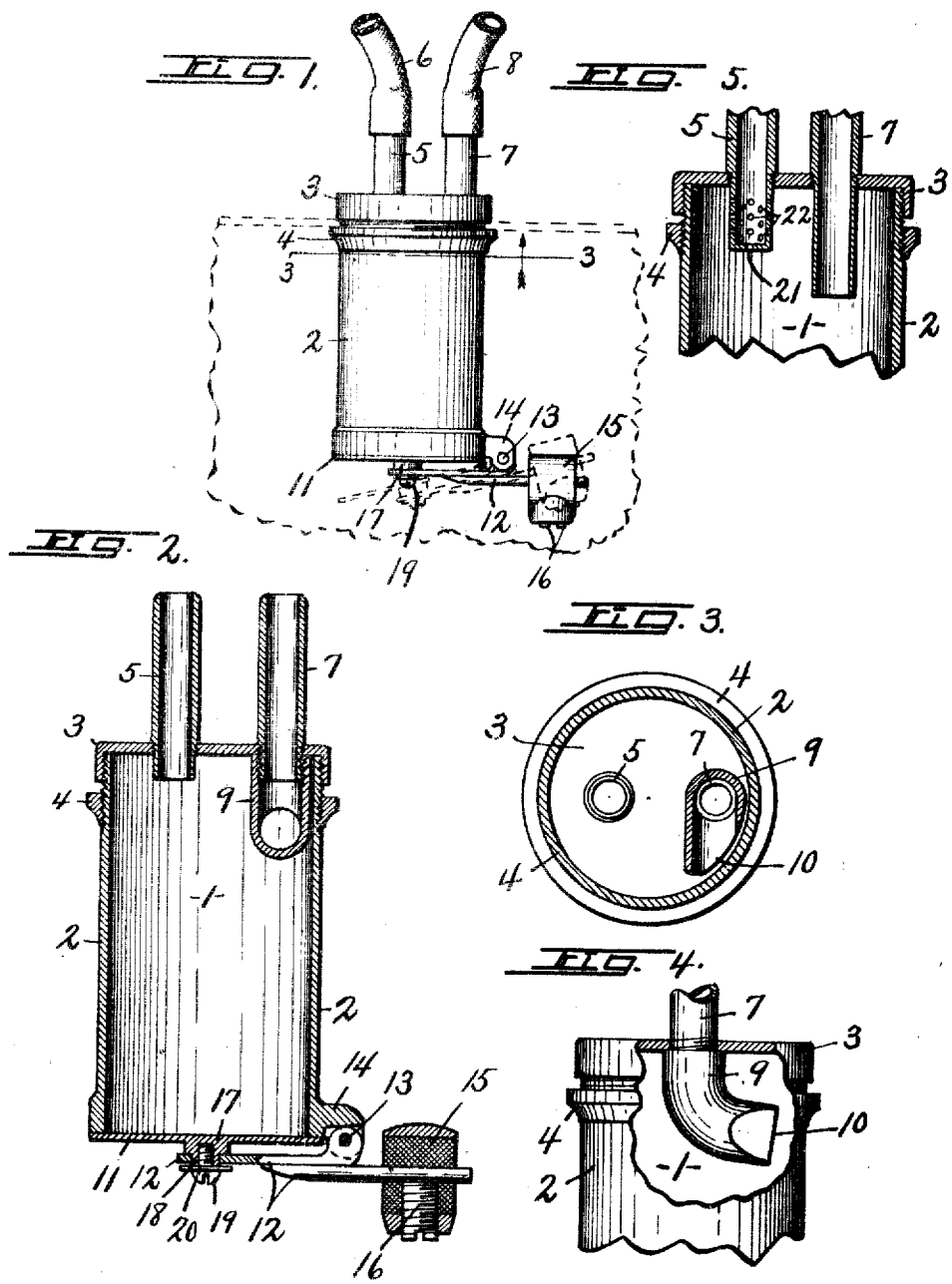

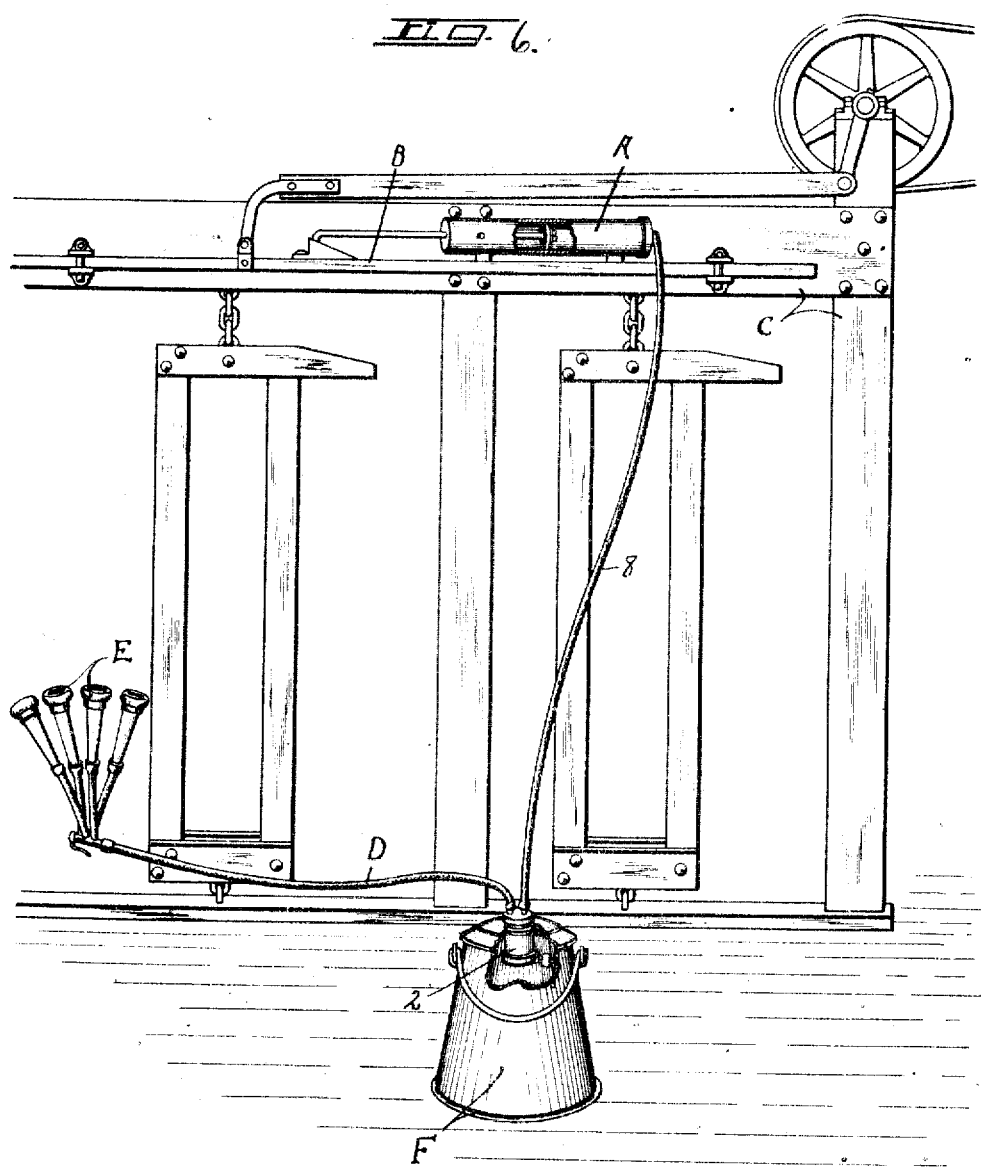

UNITED STATES PATENT OFFICE.

ARTHUR V. HINMAN AND RALPH L. HINMAN, OF ONEIDA, NEW YORK.

MILKING-MACHINE.

1,265,914. Specification of Letters Patent. Patented May 14, 1918.

Application filed October 6, 1914. Serial No. 865,319.

*To all whom it may concern:*

Be it known that we, ARTHUR V. HINMAN and RALPH L. HINMAN, citizens of the United States, and residents of Oneida, in the county of Madison, in the State of New York, have invented new and useful Improvements in Milking-Machines, of which the following, taken in connection with the accompanying drawings, is a full, clear, and exact description.

This invention relates to certain new and useful improvements in milking machines of the class set forth in Letters Patent of the United States No. 907,236 and No. 1,097,803, granted to us December 22, 1908 and May 26, 1914, respectively, and involves the use of a valved milk chamber, to the construction of which this application particularly relates.

The primary object of the invention is to provide an exceedingly simple, readily operated, easily cleaned, noiseless and highly efficient apparatus for milking one cow or a number of cows simultaneously.

A further object is to construct and arrange the valved milk chamber in such a manner that with each complete cycle of movement of the air-exhausting apparatus, milk will be drawn into the chamber and substantially completely discharged therefrom, without any of the milk entering the air-exhausting apparatus or its connections.

Other objects and advantages will appear from the following description, taken in connection with the accompanying drawings, in which—

Figure 1 is a side elevation of the valved milk chamber.

Fig. 2 is a vertical cross section of the same.

Fig. 3 is a cross section on line 3—3, Fig. 1.

Fig. 4 is a side elevation of a portion of the milk chamber, having a section broken away to show the preferred form of milk inlet.

Fig. 5 is a vertical sectional view of the upper portion of the milk chamber illustrating a slightly varied form of exhaust communication and milk inlet.

Fig. 6 is a view of the milk chamber assembled in a complete operable milking apparatus.

The invention comprises a milk chamber —1— in this illustration, cylindrical in form and vertically arranged and formed of two parts, a body —2— and a cap —3—, said parts having a threaded relation with each other, the lower edge of the cap in this illustration constituting a stop or shoulder upon the exterior of the milk chamber.

The body —2— is provided with an internally threaded ring —4— adjustable along the externally threaded portion of the body —2— and adapted to form in connection with the shoulder or stop formed by the lower edge of cap —3— a means for engaging the top portion of a pail for the reception of milk. In operation, the ring —4— is first adjusted to proper position, the body —2— is thrust upwardly through an opening in the top wall of the milk receiving receptacle or pail, illustrated in dotted lines Fig. 1, and the cap —3— is then screwed upon the body —2— until it contacts with the wall of the pail cover and forms a relatively tight connection and a smooth interior surface for the milk chamber —1—.

The milk chamber —1— is provided with a nipple —5— adapted to be connected with a suitable air-exhausting device, such as the piston pump shown in our Patent No. 907,236 above referred to, by means of a flexible hose or tubing —6—, and the nipple —5— may, as shown in Fig. 2, be an open ended tube formed in connection with or attached to the cap —3— and projecting into the milk chamber —1— or not, as desired.

The milk chamber —1— is further provided with a milk inlet comprising, as shown in Fig. 2, a tubular member —7— connected with suitable teat cups, not here illustrated, by means of a hose or flexible tubing —8—, and the member —7— may be engaged with, or as shown passed through the cap —3— and have its lower end externally threaded for engagement with a deflecting nipple —9— having an internally threaded portion, and the nipple —9— is preferably, as shown, tubular in form, curved in longitudinal cross section and having its lower end —10— lying in proximity to the inner surface of the milk chamber and having an opening extending for at least a portion of its length in substantial parallelism with the inner surface of the milk chamber —1—, so as to discharge the milk onto this smooth curved inner surface and thereby give to the milk a rotary and downwardly directed movement around the chamber, and for this purpose the discharging end of the nipple is preferably deflected slightly downwardly from the horizontal and the milk is projected into the milk chamber below the plane of termination of the air-exhausting connection, as the tube —5—, thereby avoiding the possibility of the milk being drawn into the air-exhausting device or its connections. This relative positioning of the milk inlet and the air-exhausting connections is less essential when the milk is given a rotary motion upon the smooth inner surface of the milk chamber, for the reason that with such a motion the milk will tend to cling to and spread out upon the surface of the chamber, leaving the central portion free of milk for the reception and operation of the air-exhausting connections.

When milk is drawn by suction into a chamber such as the milk chamber —1—, without the tendency for this rotary motion to set in, as is the case with the construction of milk inlet illustrated in Fig. 5, it is found impossible to prevent slight division and subdivision of the milk in the form of spray as it enters the chamber, and with the form of inlet illustrated in Fig. 5 it is preferable that the milk discharge into the chamber below the terminus of the air-exhaust connection.

The lower end of the body —2— is open and its surface is ground to form an air-tight seat for a suitably ground valve —11—, as shown circular in form and rotarily mounted upon a lever arm —12— pivoted at —13— upon a lug or projection —14— extending laterally from the body —2—, and the arm —12— is preferably provided with a weight —15— adjustable along its outer end and adapted to be held in any desired point of adjustment by means of a set screw —16—, so that the weight may be adjusted to balance the valve and normally hold the same closed through the action of gravity.

The valve —11— is provided with a projection or boss —17— having a stepped portion —18—, said boss having an internally threaded seat for the reception of an externally threaded bolt —19— having a washer —20— mounted thereon for contact with the stepped portion —18— and the inner arm of the lever —12— which is loosely mounted upon the portion —18— and in contact with the flange formed on the boss —17— by said stepped portion —18—. The engagement of the arm of the lever —12— and the portion —18— of the lug —17— is such that the valve —11— is freely rotatable upon said arm and adapted to have an air-tight, milk-tight engagement with the ground surface of the body —2—.

It will be apparent that the valve —11— is normally held in contact with the body —2— by gravity through the weight —15— during the exhaust stroke of the air-exhausting device, and that said valve is opened by the weight of the milk in the chamber when the air-exhausting device is on its return stroke.

In Fig. 5, we have illustrated a varied form of air-exhausting connection, in that the tube —5— is closed at its lower end except for a very small opening —21—, from which opening milk will discharge by gravity should any by chance be drawn into this tube, and the tube, as shown, is provided with a plurality of perforations or openings —22— through the side wall thereof so that the air will be drawn into said tube laterally rather than vertically from the milk chamber, thereby decreasing the possibility of milk being drawn into the air-exhaust connections, and this form of exhaust connection may be used in connection with the form of milk inlet shown in Figs. 2, 3 and 4, or with the form of milk inlet illustrated in Fig. 5, which comprises a straight tube discharging into the chamber, preferably downwardly as shown, although it may discharge in any suitable and desirable direction, and the inlet illustrated in Fig. 5 may be used with the form of air-exhaust connection shown in Figs. 2 and 3, or with the form shown in Fig. 5. It will be noted that in each case the milk inlet is a valveless inlet and freely communicates with the milk chamber at all times, both when milk is being drawn into the milk chamber —1— and when milk is being discharged therefrom, whereby the vacuum is released during each cycle of the air-exhausting device upon the teats of the animal being milked, and the valve —11— or milk outlet is automatically operated by gravity in conjunction with the weight of the milk in the chamber and the exhaust of air from said chamber.

It is unnecessary with this construction of milk chamber to make use of a special air-tight receptacle in connection with the apparatus for the final reception of the milk, nor is it necessary to render the receptacle air-tight by use of a special cover, as the milk chamber is rendered air-tight by means of its automatically operated valve —11— and this apparatus may, therefore, be employed with any ordinary receptacle, being supported in any manner thereon, although the manner heretofore described is preferable.

As shown in Fig. 6, the valve chamber is assembled in a complete operable milking apparatus embodying a long-stroke relatively small-diameter piston pump A connected by flexible tubing —8— to the nipple —7—. The piston rod of said pump may be driven in any suitable manner, as by a reciprocating bar B to which the piston is preferably removably connected. The bar B may, as shown, be mounted on the stanchion framework C. The nipple —5— on the valve chamber is connected by flexible tubing D to a claw carrying a series of teat cups E for engagement with the teats of a cow. The chamber —1— is assembled with and secured to the cover of a pail —F— in the manner heretofore described so that nipples —5— and —7— are outside the pail and outlet valve —11— is within the pail so that in effect the milk is discharged through the pail cover.

Although we have shown and described a particular form of device as preferable, it will be readily apparent that many changes may be made in the form and arrangement of the parts and in the details of construction and operation, without departing from the spirit of the invention as set forth in the appended claims.

What we claim is:

1. In a milking machine, a milk chamber having a milk inlet, an air exhaust connection, a milk outlet and a counter-weighted valve for said outlet, said counter-weight adjustable to allow said valve to open under different weights of milk.

2. In a milking apparatus, an elongated tubular structure having its upper end substantially closed and its lower end open to provide an outlet for milk, and provided at said lower end with a downwardly facing valve seat, an outwardly opening valve for said outlet, an air exhaust pipe connected to the upper end of said structure, a milk inlet pipe projecting into said structure and terminating at a point some distance below the termination of the air exhaust pipe and lying in close proximity to the wall of the chamber and adapted to discharge milk upon said wall so that it spreads out upon and clings to the wall, leaving a milk-free space in the upper end of the chamber from which air may be exhausted without substantial entrainment of milk during the partial filling of said structure with milk while the outlet valve is held in close contact with its seat by the suction in said structure, and a reciprocating pump connected to the air exhaust pipe.

3. A milking apparatus comprising a milk chamber having a milk inlet, and an opening for the discharge of milk from the chamber, a valve for said opening, and means for allowing said valve to open under different weights of milk.

4. A milking apparatus comprising a milk chamber having a milk inlet and an opening for the discharge of milk from the chamber, a valve for said opening, and adjustable gravity-operated means for normally holding the valve in closed position.

5. In a milking apparatus, a milk chamber having an air exhaust tube piercing the upper end of the same and terminating in a substantially closed bottom positioned within the chamber, said tube provided with a plurality of relatively small openings through its side wall, a milk inlet to said chamber, and an outlet adapted to discharge milk into a receptacle at normal atmospheric pressure, a valve for said outlet, said valve positioned outside the chamber and adapted to be held in air-tight relation with said chamber by the exhaust of air therefrom.

6. In a milking machine, a tubular milk chamber having a stop upon its outer surface, said chamber comprising two removably connected parts, one of said parts having a ring adjustable longitudinally thereof and adapted to clamp between it and the stop a portion of a milk pail, a milk inlet, an air exit, and a valved outlet for said chamber.

7. In a milking machine, a tubular milk chamber comprising two removably connected parts, one of said parts having a member adjustable thereon and adapted to receive between it and the other part, a portion of a milk receptacle, a milk inlet, a valved outlet, and means for exhausting air from said chamber.

8. In a milking machine, a tubular milk chamber comprising two removably connected parts, one of said parts having a ring adjustable longitudinally thereof and adapted to receive between it and the other part, a portion of a milk receptacle, a milk inlet, a valved outlet, and means for exhausting air from said chamber.

9. In a milking machine, a tubular milk chamber comprising two removably connected parts, one of said parts having an externally threaded portion, an internally threaded ring engaged with said threaded portion and adjustable longitudinally of said part and adapted to receive between it and the other part, a portion of a milk receptacle, a milk inlet, a valved outlet, and means for exhausting air from said chamber.

10. In a milking machine, a tubular structure open at its lower end to form a milk outlet, a valve for said outlet, a milk inlet, an air exit from said chamber, a stop upon the outer surface of the tubular structure, a member adjustable longitudinally of said structure toward and from the stop and adapted to clamp between it and said stop a portion of a milk pail cover.

11. In a milking apparatus, a milk chamber having an outlet for the discharge of milk, a counterweighted, pivoted, normally closed valve for said outlet, said valve positioned outside the chamber and opening outwardly under the weight of the milk to discharge milk into a receptacle at substantially normal atmospheric pressure, and a milk inlet projecting into the chamber and adapted to discharge milk against a stationary wall thereof, whereby the valve is relieved of the sudden projection and application of the gravity of the milk.

12. In a pneumatic milking machine, a cylindrical milk-chamber having a suction connection at one end, a milk inlet near said end in connection with a teat cup, a valved milk outlet at the other end, and means to bring the milk into rotary motion in the milk chamber whereby the milk may be kept rotating as long as it remains in said chamber and means to produce intermittent suction in said milk chamber.

13. In a pneumatic milking machine in combination with a tubular milk chamber having a suction connection at one end, a milk inlet near said end in connection with a teat cup, a valved milk outlet at the other end, of means to bring the milk into rapid rotary motion in the chamber whereby the milk may be kept rotating as long as it remains in said chamber and means to produce alternately suction and pressure in said milk chamber and teat cup.

14. In a pneumatic milking machine, a cylindrical milk chamber having milk inlet and milk outlet, means between said milk inlet and milk outlet to bring the milk into rapid rotary motion whereby the milk may be kept rotating as long as it remains in the chamber.

15. In a pneumatic milking machine, a milk chamber having milk inlet and milk outlet, and means to keep the milk under centrifugal force as long as it remains in said chamber.

16. In a milking apparatus, an elongated tubular structure having its upper end substantially closed and its lower end open to provide a milk outlet and provided at said lower end with a downwardly facing valve seat, a self-adjusting normally closed outwardly opening valve for said outlet, an air exhaust pipe connected to the upper end of said structure, a milk inlet pipe adapted to discharge milk into said structure at a point some distance below the termination of the air exhaust pipe, thereby forming a milk-free space from which air may be exhausted without substantial entrainment of milk during the partial filling of said structure with milk while the outlet valve is held in close contact with its seat by suction in said structure, and a reciprocating pump connected to the air exhaust pipe.

17. A milking apparatus consisting of an elongated tubular structure having its upper end substantially closed and its lower end open to provide a milk outlet and provided at said lower end with a downwardly facing valve seat, a self-adjusting normally closed outwardly opening valve for said outlet, an air exhaust pipe connected to the upper end of said structure, a milk inlet pipe adapted to discharge milk into said structure at a point some distance below the termination of the air exhaust pipe, thereby forming a milk-free space from which air may be exhausted without substantial entrainment of milk during the partial filling of said structure with milk while the outlet valve is held in close contact with its seat by suction in said structure, teat cups, a flexible hose connecting the teat cups to the inlet pipe so that the tubular structure may be positioned at a distance from the animal milked and may remain in stationary condition independent of the movement of the teat cups, and a reciprocating pump connected to the air exhaust pipe.

18. A milking apparatus consisting of an elongated tubular structure having its upper end substantially closed and its lower end open to provide a milk outlet and provided at said lower end with a downwardly facing valve seat, a self-adjusting outwardly opening valve for said outlet, a counter-weighted lever for normally holding said valve in closed position, an air exhaust pipe connected to the upper end of said structure, a milk inlet pipe adapted to discharge milk into said structure at a point some distance below the termination of the air exhaust pipe, thereby forming a milk-free space from which air may be exhausted without substantial entrainment of milk during the partial filling of said structure with milk while the outlet valve is held in close contact with its seat by suction in said structure, teat cups, a flexible hose connecting the teat cups to the inlet pipe so that the tubular structure may be positioned at a distance from the animal milked, and may remain in stationary condition independent of the movement of the teat cups, and a reciprocating pump connected to the air exhaust pipe.

In witness whereof we have hereunto set our hands this second day of October, 1914.

ARTHUR V. HINMAN.
RALPH L. HINMAN.

Witnesses:
R. H. WOOLVER,
MARY E. BABCOCK.